US006965899B1

(12) United States Patent
Subramaniam et al.

(10) Patent No.: US 6,965,899 B1
(45) Date of Patent: Nov. 15, 2005

(54) ONLINE REORGANIZATION AND REDEFINITION OF RELATIONAL DATABASE TABLES

(75) Inventors: Mahesh Subramaniam, Foster City, CA (US); Joan Loaiza, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 714 days.

(21) Appl. No.: 09/968,703

(22) Filed: Sep. 28, 2001

(51) Int. Cl.[7] ............................................. G06F 17/30
(52) U.S. Cl. ...................................................... 707/102
(58) Field of Search ........................................ 707/102

(56) References Cited

U.S. PATENT DOCUMENTS

| | | | | |
|---|---|---|---|---|
| 5,440,743 A | * | 8/1995 | Yokota et al. | 710/200 |
| 5,448,727 A | * | 9/1995 | Annevelink | 707/101 |
| 5,555,388 A | * | 9/1996 | Shaughnessy | 711/100 |
| 5,608,903 A | * | 3/1997 | Prasad et al. | 707/10 |
| 5,978,426 A | * | 11/1999 | Glover et al. | 375/376 |
| 6,016,497 A | * | 1/2000 | Suver | 707/103 R |
| 6,122,630 A | * | 9/2000 | Strickler et al. | 707/8 |
| 6,173,313 B1 | * | 1/2001 | Klots et al. | 709/203 |
| 6,268,850 B1 | * | 7/2001 | Ng | 345/866 |
| 6,304,867 B1 | * | 10/2001 | Schmidt | 707/2 |
| 6,363,387 B1 | * | 3/2002 | Ponnekanti et al. | 707/10 |
| 6,460,055 B1 | * | 10/2002 | Midgley et al. | 707/204 |
| 6,519,613 B1 | * | 2/2003 | Friske et al. | 707/202 |
| 6,598,059 B1 | * | 7/2003 | Vasudevan et al. | 707/203 |
| 6,611,848 B1 | * | 8/2003 | Bradley | 707/201 |
| 6,633,870 B1 | * | 10/2003 | Bradley | 707/8 |
| 6,633,883 B2 | * | 10/2003 | Koskas | 707/101 |
| 6,681,225 B1 | * | 1/2004 | Uceda-Sosa et al. | 707/8 |
| 6,745,209 B2 | * | 6/2004 | Holenstein et al. | 707/203 |
| 6,801,983 B2 | * | 10/2004 | Abe et al. | 711/130 |
| 6,834,290 B1 | * | 12/2004 | Pugh et al. | 707/205 |

OTHER PUBLICATIONS

Lassen et al. Experiences with object oriented development in PL/SQL, Center for Object Technology COT/4-18-V1.4, 2000.*
Object Cache Navigation, Oracle Call Interface PRogrammer's Guide, Release 2 (9.2), Part No. A96584-10, 1996, 2002.*
Date et al, A Guide to SQL/DS, 1989, Addison-Wesley, Chapter 10.*
Quest Software, Inc., LiveReorg®, "Reorganization for the 24×7 Database," 2001.

* cited by examiner

Primary Examiner—Wayne Amsbury
(74) Attorney, Agent, or Firm—Hickman Palermo Truong & Becker LLP

(57) ABSTRACT

Techniques are provided for allowing the reorganization and/or redefinition of data in a relational database with minimal or no downtime by allowing "online" reorganization/redefinition of the data. According to one aspect of the invention, an empty revised table is created in the same schema as the target table. The revised table is created with the attributes that are desired for the reorganization/redefinition of the target table. Triggers, constraints, grants and indexes that are associated with the target table are replicated for the revised table. The reorganization/redefinition is performed by using an underlying mechanism that involves using incrementally maintainable materialized views.

According to one feature, the revised table is initialized and periodically synchronized with the target table. After the reorganization and/or redefinition is complete on the revised table, the revised table and the target table switch identities such that the revised table is now the target table and the target table becomes the revised table.

22 Claims, 2 Drawing Sheets

ONLINE REORGANIZATION AND REDEFINITION OF RELATIONAL DATABASE TABLES

FIELD OF THE INVENTION

The present invention relates generally to relational databases and, more specifically, to online reorganization and redefinition of relational database tables.

BACKGROUND OF THE INVENTION

Data containers in large active relational databases often need to be reorganized and/or redefined. For example, a particular relational database table may be redefined to improve the performance of processing queries and data manipulation language (DML) operations against the particular relational table. The redefinition operation may involve, for example, adding a new column to the table. Tables may also have to be reorganized because the database and business applications that use the tables may require changes to the underlying structure of the tables. Tables that are to be reorganized and/or redefined are herein referred to as "target tables".

In one approach, a target table is reorganized and/or redefined by locking the target table in a manner that prevents users from querying and performing DML operations on all or part of the target table. In other words, the target table is inaccessible to users for the entire duration of the reorganization and/or redefinition operation. The duration of inaccessibility to the data in the relational database is herein referred to as "downtime". The problem with such an approach is that the downtime associated with the reorganization/redefinition may be unacceptably lengthy if the target tables are massive and the reorganization/redefinition is extensive. In addition, it is difficult to implement such a feature when dependent objects, such as indexes, are also involved.

In the conventional approach, the target table is taken "offline" for the purpose of reorganization/redefinition. Thus, the target table is inaccessible to users during the period that the target is offline. For example, a given target table is first exported from the relational database for the process of reorganization/redefinition. After the target table is reorganized/redefined, the target table is imported back into the relational database. One problem with such an approach is that indexes, constraints, and triggers that are associated with a target table are typically dropped in order to speed up the import process. Thus, the indexes, constraints, and triggers associated with the target table need to be re-created. Each hour of downtime can cost millions of dollars for a corporation.

Based on the foregoing, it is clearly desirable to provide a mechanism for reorganizing/redefining data in relational databases with little or no downtime.

SUMMARY OF THE INVENTION

Techniques are provided for allowing the reorganization and/or redefinition of data in a relational database with minimal or no downtime by allowing "online" reorganization/redefinition of the data. According to one aspect of the invention, an empty "revised" table is created in the same schema as the target table. Initially, the revised table is merely an "interim" table that is not directly accessed by user queries. However, when completed and populated, the revised table is used to answer queries that are directed to the target table.

Specifically, the revised table is created with the attributes that are desired for the reorganization/redefinition of the target table. Triggers, constraints, grants and indexes that are associated with the target table are recreated for the revised table. The revised table is populated with data from the target table using an incremental refresh mechanism, similar to the mechanisms commonly used to incrementally refresh materialized views.

According to one feature, the revised table is initialized and periodically synchronized with the target table. After the reorganization and/or redefinition is complete on the revised table, the database system begins using the revised table to answer queries that are directed to the target table. According to one embodiment, the revised table and the target table switch identities such that the revised table is assumes the role of the target table.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Techniques are provided for online reorganization and redefinition of relational database tables. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Functional Overview

The feature for allowing users full access to a target table in a relational database during the process of data reorganization and/or redefinition is herein referred to as "online modification" of the target table. During the online modification of the target table, users can access the target table, both for read (select) and write (insert and modify) operations. Typically, during an upgrade of a given application of the relational database system, the database administrator needs to modify one or more tables in the relational database. By using the online modification technique, the database administrator can perform the online modification operation at any time without impinging on the data availability of the target tables.

The online modification technique allows the database administrator to perform various types of modifications to the target table, including but not limited to: 1) modify the storage parameters of the target table, 2) add support for parallel queries to be performed on the target table after the target table is modified, 3) change a heap organized target table to an Index Only Table (IOT) or vice versa, 4) move the target table to a different tablespace, 5) add or drop partitioning support for the target table, 6) recreate the target table in order to reduce fragmentation, 7) add, drop, or rename columns in the target table, 8) transform data in the target table.

Figure 1:
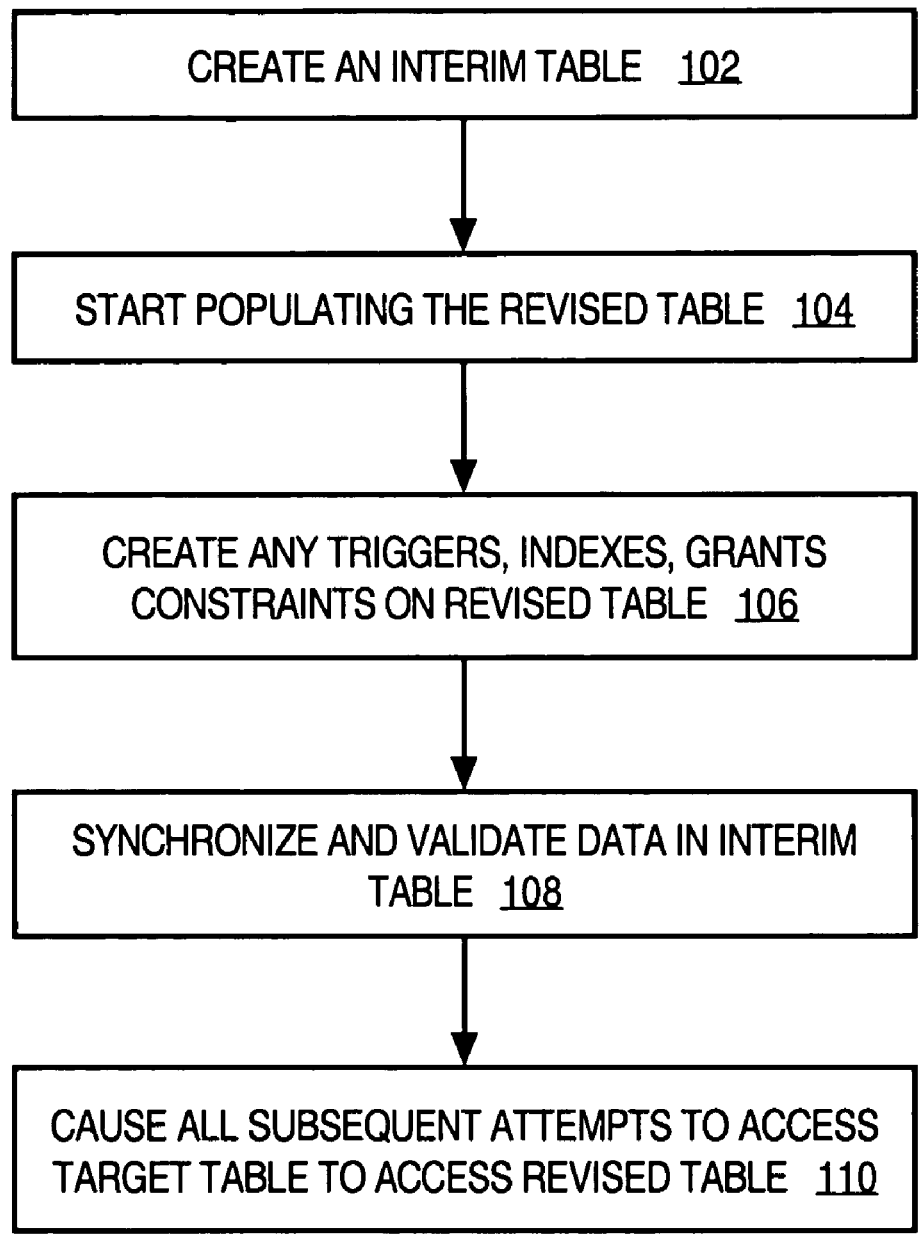
FIG. 1 is a flowchart that illustrates the online modification operation of a target table in a relational database.

FIG. 1 is a flowchart that illustrates the online modification operation of a target table in a relational database. At block 102 of FIG. 1, an empty revised table is created with all the attributes that are desired for the online modification. At block 104, the database system starts populating the revised table based on data in the target table. Data from the target table is copied over to the revised table based on column mapping information. Column mapping information is explained in greater detail herein.

At block 106, any triggers, indexes, grants and constraints that exist for the target table are created for the revised table. However, such triggers, indexes, grants and constraints are created disabled for the revised table. According to one embodiment, such triggers, indexes, grants and constraints are enabled only when the online modification operation is successfully completed.

At block 108, the data in the revised table is synchronized with the data in the target table. During part of this particular step, access to the target table may be disabled. During all other steps of the online modification process, the target is accessible by users. After step 108, the revised table will accurately reflect all changes made to data in the target table, including those changes that were made during the online modification process.

At block 110, all subsequent attempts to access the target table are caused to access the revised table instead. Example techniques for accomplishing step 110 are described hereafter. However, the present invention is not limited to any specific technique for causing subsequent attempt to access the target table to access the revised table.

For the purpose of explanation, many of the examples given herein address the scenario in which a single target table is being reorganized into a single revised table. However, the present invention is not limited to this scenario. Specifically, the online modification techniques described herein can be used for transforming: 1) one table to many tables, 2) many tables to one table, 3) many tables to many tables, and 4) sub-table to sub-table. Further details are described herein.

Start of Online Modification Operation

According to certain embodiments, the online modification operation is started by providing the following as inputs: 1) the schema name of the target table, 2) the name of the target table, 3) the name of the revised table, and 4) column mapping information between the target table and the revised table. In certain embodiments, if the column mapping information is not supplied, then it is assumed that all the columns of the target table, with the names of the columns unchanged, are to be included in the revised table. If the column mapping information is supplied, then only those columns that are explicitly specified in the column mapping information are considered.

Intermediate Synchronization

Because the target table remains online, it is possible that a large number of Data Manipulation Language (DML) operations have occurred on the target table between the time when the online modification operation is started and the time when the online modification is completed. Only the final step of the online modification operation involves locking the target table to synchronize the data in the revised table with the data in the target table.

In certain embodiments of the invention, the synchronization of data between the target table and the revised table takes place periodically during the entire online modification operation. The synchronization of data between the target table and the revised table may be performed multiple times according to the discretion of the database administrator who is tasked with performing the online modification. By periodically synchronizing the data between the target table and the revised table, the time taken to complete a final synchronization immediately prior to bringing the revised table online is greatly reduced.

The data in the revised table can be validated to ensure that the online modifications are performed accurately.

Various techniques may be used to perform the synchronization of data between the target table and the revised table. Such techniques may use similar or identical techniques to those currently used to perform incremental refreshes to materialized views in relational database systems. Examples of such techniques are described in U.S. Pat. No. 6,205,451, entitled, "METHOD AND APPARATUS FOR INCREMENTAL REFRESH OF SUMMARY TABLES IN A DATABASE SYSTEM" filed by William D. Norcott and James Finnerty on May 22, 1998, the contents of which are incorporated by reference herein, in U.S. patent application Ser. No. 09/224,063, entitled, "METHOD AND APPARATUS FOR EFFICIENTLY REFRESHING SETS OF SUMMARY TABLES AND MATERIALIZED VIEWS IN A DATABASE MANAGEMENT SYSTEM" filed by William D. Norcott and Mohamed Ziauddin on Dec. 28, 1998, and in U.S. Pat. No. 5,963,959, entitled "FAST REFRESH OF SNAPSHOTS" filed by "Harry Sun, Alan Downing, and Benny Souder" the contents of which are incorporated by reference herein.

Completion of Online Modification Operation

Invoking the appropriate database procedure completes the online modification operation. According to certain embodiments, when the creation of the revised table is complete, i.e., when the revised table contains the online modifications that are desired for the target table, a mechanism is provided to cause all subsequent user attempts to access the target table to access to revised table instead.

The operation of causing all subsequent user attempts to access the target table to access to revised table instead may be implemented in a variety of ways, including what is herein referred to as the "switch operation". The switch operation is very brief and has a duration that is independent of the size of the table and independent of the complexity of the redefinition. According to certain embodiments of the invention, the switch operation involves switching the identity of the target table with the identity of the revised table.

Due to the switch operation, the revised table assumes the identity of the target table and has all the attributes and modifications that are desired. The revised table that assumes the identity of the target table due to the switch operation will herein be referred to as the "online revised table". The indexes, constraints, grants and triggers are enabled for the online revised table. The indexes in the online revised table may now be re-named if so desired.

Similarly, due to the switch operation, the target table assumes the identity of the revised table and is referred to as the offline target table. The offline target table can be dropped from the database. Any indexes, constraints, grants and triggers associated with the new offline target table are disabled and/or dropped.

Abort and Clean Up

In the event that an error occurs during the online modification operation, or if the database administrator chooses to abort the online table modification operation, the appropriate database procedure for aborting the online table modification operation can be invoked. When invoked, such a procedure drops temporary logs and tables that are associated with the online modification operation. Once such a procedure is invoked, the database administrator can then drop the revised table and the objects that are associated with the revised table.

Example of Online Table Modification (One Table to One Table)

The following example illustrates online modification of a non-partitioned table named EMP, and with columns EMPNO, NAME, SALARY, PHONE. Assume that target table EMP is in schema U1. Target table EMP is to be online modified as follows: 1) Column salary is to be multiplied by a factor of 1.10 and renamed as SAL, 2) Column PHONE is to be dropped, 3) a new column DEPTNO with default value of 10 is to be added, 4) the modified table is to be partitioned by range on EMPNO. The following steps 1 through 4 illustrate the online modification of table Emp. The syntax used in the statements in Steps 1 through 4 is merely illustrative. The actual syntax of statements used for online table modification may vary from implementation to implementation. The present invention is not limited to any particular syntax.

STEP 1: Create a Revised Table int_emp
CREATE TABLE int_emp
(empno NUMBER PRIMARY KEY, name VARCHAR2 (100), sal NUMBER, deptno NUMBER DEFAULT 10)
PARTITION BY RANGE(empno)
PARTITION emp1000 VALUES LESS THAN (1000) TABLESPACE tbs_1,
PARTITION emp2000 VALUES LESS THAN (2000) TABLESPACE tbs_2;
STEP 2: Start the Online Modification Operation
DBMS_REDEFINITION.START_REDEF_TABLE('u1', 'emp', 'int_emp', 'empno empno, name name, salary*1.10 sal');
During step 2, the following occur:
1) A materialized view log on EMP is created;
2) A materialized view INT_EMP is created.
In addition, any triggers, indexes, grants and constraints that exist for the target table EMP are created for the revised table INT_EMP. However, such triggers, indexes, grants and constraints are created disabled for the revised table INT_EMP.
STEP 3: Optionally, Synchronize the Revised Table int_emp with Target Table Emp
DBMS_REDEFINITION.SYNC_INTERIM_TABLE ('u1', 'emp', 'int_emp');
STEP 4: Complete the Online Modification
DBMS_REORG.FINISH_REDEF_TABLE('u1', 'emp', 'int_emp');
During step 4, the following occur:
1) The materialized view INT_EMP is refreshed;
2) The target table EMP is locked;
3) After the target table EMP has been locked, the materialized view INT_EMP is refreshed once again;
4) The identities of this table EMP and INT_EMP are switched and any indexes, constraints, grants and triggers on the online revised table are enabled while any indexes, constraints, grants and triggers associated with the offline target table are disabled and/or dropped;
5) The materialized view INT_EMP and the materialized view logs on EMP are dropped;
6) The table EMP is unlocked.

After step 4, online revised table emp is modified such that it has all the attributes of the pre-switch revised table int_emp. The state of the pre-switch revised table is the state immediately prior to the switch operation explained herein.

One Table to Many Tables

Assume that in the year 2001, a company has an application that heavily uses a table named "table A" and that has the following fields:
1. message #
2. originating id
3. message type
4. text(4000)

Assume table A has a message type field. This message type field tells the application how to interpret the text information. For example, the text information could be an address or a comment. Table A is said to be in 2nd normal form. The 2nd normal form may be used by an application as a tradeoff between speed, storage space, and complexity of management and application development.

Assume that by the year 2002, the application gets more complex and the company gets larger, the application may find that the 2nd normal form provides the wrong tradeoffs. Thus, in the 2002 version of the application, target table A is modified into in the 3rd normal form. In the $3^{rd}$ normal form, target table A is split into many tables. Assume that target table A is modified into a new table A (msg#, originating id, msg_type), table A2 (msg#, address), and table A3 (msg#, comment). The application upgrade from the 2001 to 2002 versions needs to split target table A into a new table A, and tables A2, and A3. Assume that the company does not want to suffer the costs of a lengthy downtime. Thus, table A is a good candidate for then online table modification operation.

The first step for modifying table A into a new table A, and tables A2, and A3 is to create 3 new tables as follows:
create table Temp_A (msg# number, orig_id number, msg_type number);
create table A2(msg# number, address varchar2(4000));
create table A3msg# number, comment varchar2(4000));
Next, a query list is created:
Table Temp_A is defined as: select msg#, orig_id, msg_type from A;
Table A2 is defined as: select msg#, text from A where msg_type=1;
Table A3 is defined as: select msg#, text from A where msg_type=2;
The list of post-modified tables are Table A, A2, A3. The list of "revised tables" are Temp_A, A2, A3. Assume that all tables are owned by user U.
The online modification may be started by performing the following initializations:
owner_list(1):='U';
owner_list(2):='U';
owner_list(3):='U';
interim_table_list(1):='Temp_A';
interim_table_list(2):='A2 ';
interim_table_list(3):='A3';
post_modified_table_list(1)='A';
post_modified_table_list(2)=NULL;
post_modified_table_list(3)=NULL;
query_list(1)='select msg#, orig_id, msg_type from A';
query_list(2)='select msg#, text from A where msg_type=1';
query_list(3)='select msg#, text from A where msg_type=2';

where owner_list is a collection of schema names and interim_table_list is a collection of interim table names.

After these initializations, the appropriate database procedure may be invoked as follows:

Dbms_redefiniton.start_redef_table(owner_list,
   interim_table_list, post_modified_table_list,
   query_list);

In one embodiment, when the online modification procedure is invoked, the following events take place:

1) A "Materialized View" log is created on table A:

2) Three Materialized Views are created:

For example, a materialized view Temp_A is created using prebuilt table as select msg#, orig_id, msg_type from A; a materialized view A2 is created using prebuilt table as select msg#, text from A where msg_type=1; and a materialized view A3 is created using prebuilt table as select msg#, text from A where msg_type=2.

The creation of the materialized views can take up to several hours. However, during this time, users still have access to the target table A.

The next step is to synchronize the data of the target table A with the revised tables, Temp_A, A2, A3 by calling the dbms_redefinition.sync_interim_table procedure. This step refreshes the materialized views. According to one embodiment, the following command may be used to perform the synchronization:

DBMS_REDEFINITION.SYNC_REDEF_TABLE
   (owner_list, interim_table_list)

Finally, the online modification is completed by calling the dbms_finish_redef table procedure. According to one embodiment, the call has the following form:

DBMS_REDEFINTION.FINSH_REDEF_TABLE
   (owner_list, interim_table list,
   post_modified_table_list)

In this step, the following occurs:

1. Materialized Views of Temp_A, A2, A3 are refreshed. The time for the refresh may be on the order of minutes.
2. Table A is locked at which time no more updates to the data in Table A are allowed. This is where the downtime begins. At this time, the 2001 version of the application should not be used any more.
3. After the table A is locked, the materialized views of Temp_A, A2, A3 are refreshed again.
4. Table A's identity is switched with table Temp_A. Neither table A2 nor A3 needs its identity switched.
5. Table A (which used to be Temp_A) is unlocked. It was probably unavailable for only a period of seconds.

At this time, the 2002 version of the application can be used. Downtime was on the order of seconds instead of hours by using online redefinition. The small amount downtime is typically not apparent to the user who is trying to access the target table.

Many Table to One Table

Assume that in the year 2003, the above database application has changed again to require modification of tables in the relational database system. Assume that performance of the application went down due to the conversion of table A to the 3rd normal form because of the continuous joins between A, A2 and A3. As a result, the 2003 version denormalizes the tables from tables A, A2, A3 back into the 2001 version of table A.

The first step for modifying tables A, A2, and A3 into the 2001 version of table A is to create a revised table as follows:
   create table Temp_A (msg# number, orig_id number,
       msg_type number, msg_text varchar2(4000));
Next, a query list is created as follows:
   Table Temp_A is defined as: select msg#, orig_id,
       msg_type, address from A, A2 where
       A.msg#=A2.msg# union select msg#, orig_id,
       msg_type, comment from A, A3 where
       A.msg#=A3.msg#;

The list of post-modified tables comprises Table A. The list of "revised tables" are Temp_A. Assume that all tables are owned by user U.

The online modification may be started by performing the following initializations:
   owner_list(1):='U'
   interim_table_list(1):='Temp_A'
   post_modified_table_list(1):='A';
   query_list(1):='select msg#, orig_id, msg_type, address
       from A, A2 where A.msg#=A2.msg# union select
       msg#, orig_id, msg_type, comment from A, A3 where
       A.msg#=A3.msg#' where exist_table_list is a collection of existing tables and new_table_list is a collection of new tables.

After the initializations have been performed, the appropriate database procedure may be invoked as follows:
   dbms_redefinition.start_redef table (owner_list,
       interim_table_list, post_modified_table_list,
       query_list);

In one embodiment, when the online modification procedure is invoked, the following events take place:

1. A Materialized View log is created on table A, A2, A3.
2. One Materialized View is created. For example, a materialized view Temp_A using prebuilt table as select msg#, orig_id, msg_type, address from A, A2 where A.msg#=A2.msg# union select msg#, orig_id, msg_type, address from A, A3 where A.msg#=A3.msg#;

The creation of the materialized views can take up to several hours. However, during this time, users still have access to the target table A. The next step is to synchronize the data of the target tables A, A2 and A3 with the revised table, Temp_A. This synchronization may be performed through the following call:

DBMS_REDEFINITION.SYNC_REDEF_TABLE
   (owner_list, interim_table_list)

Finally, the online modification is completed by calling the dbms_finish_redef table procedure. This may be performed by the following call:

DBMS_REDEFINITION.FINISH_REDEF_TABLE
   (owner_list, interim_table-list,
   post_modified_table_list)

In this step, the following occurs:

1. Materialized View Temp_A is refreshed. The time for the refresh may be on the order of minutes.
2. Tables A, A2 and A3 are locked. This is where the downtime begins. At this time, the 2002 version of the application may not be used any more.
3. Table A's identity is switched with table Temp_A.
4. After tables A, A2 and A3 are locked, the materialized view Temp_A is refreshed again.
5. Table A (which used to be Temp_A) is unlocked. It was probably unavailable for only a period of seconds.

At this time, the 2003 version of the application can be used. Downtime was on the order of seconds instead of hours by using online redefinition.

Many Tables to Many Tables

A table can be subdivided into subdivisions called "partitions".

For this example consider two non-partitioned tables CUSTOMER(cust_id, name, address) and orders (order_id, customer_id, order_line_id, item_id, item_price) which need to be re-defined online as follows:

The customer table will have a new column which will contain the sum of all orders for that customer.

The orders table will be split into two tables. The first table which will be named orders after the redefinition will contain the order_id, customer_id and the total for this individual order. The second table which will be named order_line after the redefinition will contain the orderline_id, order_id, item_id and the item_price.

The post-redefinition order_line will be partitioned by range on order_id.

In this case the user will have to create the three interim tables as follows.

create table int_customer
(cust_id number,
name varchar2 (30),
address varchar2 (1000),
cust_totals number);
create table int_orders
(order_id number,
cust_id number,
order_totals number);
create table order_line
(order_line_id number
order_id number,
item_id number,
item_price number)
partition by range (order_id)
(partition ord1000 values less than (1000) tablespace tbs_1,
partition ord2000 values less than (2000) tablespace tbs_1,
partition ord2000 values less than (2000) tablespace tbs_1);

Then the user will start the redefinition process by executing the following call:
uname_list(1):='U1';
uname_list(2):='U2';
uname_list(3):='U3';
list of interim tables
   int_table_list(1):='INT_CUSTOMER';
   int_table_list(2):='INT_ORDERS';
   int_table_list(3):='ORDER_LINE';
   corresponding list of post-redef table names (one for each interim table)
     post_table_list(1):='CUSTOMER';
     post_table_list(2):='ORDERS'
     post_table_list(3):='';

--- list of corresponding mapping queries (one for each interim table)

query_list(1) := 'select c.cust_id, c.name, c.address,
        sum(o.item_price) cust_totals
      from customer c, orders o
      where c.cust_id = o. cust_id
      group by c.cust_id';
query_list(2) := 'select o.order_id, o.cust_id,
        sum(o.item_price) order_totals
      from orders o
      group by o.order_id';
query_list(3) := 'select order_line_id, order_id, item_price from orders';

---

-continued list of corresponding mapping queries (one for each interim table)

dbms_redefinition.start_redef_table(uname_list,
                         int_table_list,
                         post_table_list,
                         query_list;

---

During this step, the following occur:
1. Materialized view logs on CUSTOMERS and ORDERS are created;
2. Materialized view INT_CUSTOMER, INT_ORDERS and ORDER_line are created using the corresponding queries in the query_list.

After this step the user can then create any triggers, indices and constraints on the interim tables. Any referential constraints involving these interim tables should be created disabled (they will be automatically enabled after the redefinition). The user should also define any grants associated with the interim tables and these grants will replace the grants on the original table after redefinition.

The user can optionally synchronize the interim tables by calling sync_interim_table( )
   dbms_redefinition.sync_redef_table(uname_list,
     int_table_list);

The user can then complete the redefinition process by calling

--- finish_redef_table( )
   dbms_redefinition.finish_redef_table(uname_list,
                                int_table_list);
                                post_table_list);

---

During this step, the following occur:
1. The materialized views INT_CUSTOMER, INT_ORDERS and ORDER_LIN are refreshed;
2. The target tables CUSTOMER and ORDERS are locked.
3. After the target tables CUSTOMER and ORDERS have been locked, the materialized view INT_CUSTOMER, INT_ORDERS and ORDER_LIN are refreshed once again.
4. The identities of the table CUSTOMER and INT_CUSTOMER are switched. Similarly, the identities of the table ORDERS and INT_ORDERS are switched.
5. The materialized views INT_CUSTOMER, INT_ORDERS and ORDER_LINE and the materialized view logs on CUSTOMER and ORDERS are dropped.
6. The tables CUSTOMER and ORDERS are unlocked.

Sub Table to Sub Table

A table can be subdivided into tables with subdivisions called "partitions". The techniques described herein with reference to "one table to one table", "one table to many tables", "many tables to one table", "many tables to many tables" can be applied to partitions of a table.

Consider a table T1 with two partitions p1 and p2. In this case, the user wants to online redefine partition p1 only. The user will first create an interim table int_p1 which will eventually replace the partition p1. The logical structure of the interim table must be consistent with that of the original partition.

The following are steps performed by the user:
create interim table int_p1 (post-redefinition version of current partition p1)
start the redefinition process by calling start_redef_fragment( )
dbms_redefinition.start_reder_fragment ('U1', 'T1', 'P1', 'INT_P1')
The user can optionally synchronize the interim table using dbms_redefinition.sync_interim_fragment ('U1', 'T1', 'INT_1');
The user can complete the redefinition process by calling finish_redef_fragment ( )
dbms_redefinition.finish_redef_fragment ('U1', 'T1', 'P1', 'INT_1');

Hardware

Figure 2:
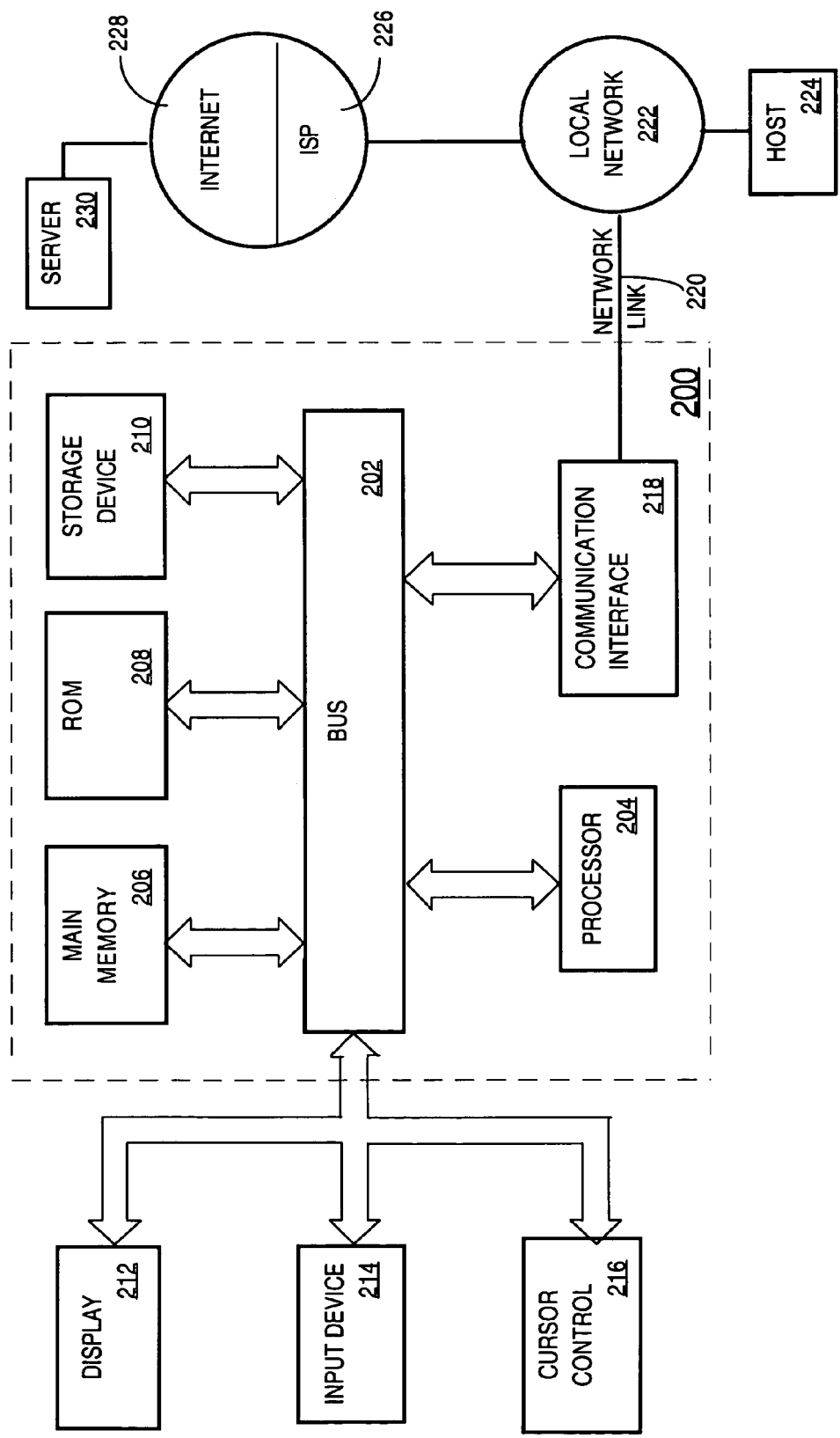
FIG. 2 depicts a computer upon which embodiments of the invention may be implemented.

FIG. 2 is a block diagram that illustrates a computer system 200 upon which an embodiment of the invention may be implemented. Computer system 200 includes a bus 202 or other communication mechanism for communicating information, and a processor 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions to be executed by processor 204. Computer system 200 further includes a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

The invention is related to the use of computer system 200 for implementing the techniques described herein. According to one embodiment of the invention, those techniques are implemented by computer system 200 in response to processor 204 executing one or more sequences of one or more instructions contained in main memory 206. Such instructions may be read into main memory 206 from another computer-readable medium, such as storage device 210. Execution of the sequences of instructions contained in main memory 206 causes processor 204 to perform the process steps described herein. One or more processors in a multi-processing arrangement may also be employed to execute the sequences of instructions contained in main memory 206. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infrared transmitter to convert the data to an infrared signal. An infrared detector coupled to bus 202 can receive the data carried in the infrared signal and place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218. In accordance with the invention, one such downloaded application implements the techniques described herein.

The received code may be executed by processor 204 as it is received, and/or stored in storage device 210, or other non-volatile storage for later execution. In this manner, computer system 200 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for modifying a target table within a relational database, the method comprising the steps of:
   creating a revised table that has one or more attributes that are different than corresponding attributes of the target table;
   while the revised table is being created preventing user access to the revised table while allowing user access to the target table;
   when creation of the revised table is complete, performing the steps of:
   locking the target table;
   synchronizing the revised table with the target table; and
   causing all subsequent attempts to access the target table to access the revised table.

2. The method of claim 1, wherein:
   the step of creating the revised table involves creating the revised table having a first name and wherein the target table has a second name; and
   the step of causing all subsequent attempts to access the target table to access the revised table involves assigning to the revised table the second name and assigning to the target table the first name.

3. The method of claim 1, further comprising providing column mapping information between the target table and the revised table.

4. The method of claim 1, wherein the one or more attributes that are different than corresponding attributes of the target table include at least one of:
   storage parameters that are associated with the revised table;
   re-location to a tablespace that is different than a tablespace that is associated with the target table;
   renaming columns that are copied from the target table;
   adding new columns to the revised table; and
   transforming data one or more columns of the revised table.

5. The method of claim 1, further comprising the step of creating for the revised table any grants, triggers, constraints and indexes that correspond to the target table.

6. The method of claim 5, wherein the grants, triggers, constraints and indexes that are created for the revised table are disabled while the revised table is being created.

7. The method of claim 5, wherein the grants, triggers, constraints and indexes that are created for the revised table are enabled when the creation of the revised table is complete.

8. The method of claim 5, wherein the corresponding grants, triggers, constraints and indexes of the target table are disabled when the creation of the revised table is complete.

9. The method of claim 1 wherein:
   the step of creating a revised table that has one or more attributes that are different than corresponding attributes of the target table includes creating a plurality of revised tables;
   while the plurality of revised tables are being created preventing user access to the plurality of revised tables while allowing user access to the target table;
   when creation of the revised tables is complete, performing the steps of:
   locking the target table;
   synchronizing the plurality of revised tables with the target table; and
   causing all subsequent attempts to access the target table to access one or more of the revised tables.

10. The method of claim 1 wherein:
    the step of creating a revised table that has one or more attributes that are different than corresponding attributes of the target table includes creating a plurality of revised tables based on a plurality of target tables;
    while the plurality of revised tables are being created, preventing user access to the plurality of revised tables while allowing user access to the plurality of target tables;
    when creation of the revised tables is complete, performing the steps of:
    locking the plurality of target tables;
    synchronizing the plurality of revised tables with the plurality of target tables; and
    causing all subsequent attempts to access at least one of the plurality of target tables to access one or more of the revised tables.

11. The method of claim 1 wherein:
    the step of creating a revised table that has one or more attributes that are different than corresponding attributes of the target table includes creating a revised table based on a plurality of target tables;
    while the revised table is being created, preventing user access to the revised table while allowing user access to the plurality of target tables;
    when creation of the revised table is complete, performing the steps of:
    locking the plurality of target tables;
    synchronizing the revised table with the plurality of target tables; and
    causing all subsequent attempts to access at least one of the plurality of target tables to access the revised table.

12. A computer-readable medium carrying instructions for modifying a target table within a relational database, the instructions comprising instructions for performing the steps of:
    creating a revised table that has one or more attributes that are different than corresponding attributes of the target table;
    while the revised table is being created preventing user access to the revised table while allowing user access to the target table;

when creation of the revised table is complete, performing the steps of:
  locking the target table;
  synchronizing the revised table with the target table; and
  causing all subsequent attempts to access the target table to access the revised table.

13. The computer-readable medium of claim 12, wherein:
the step of creating the revised table involves creating the revised table having a first name and wherein the target table has a second name; and
the step of causing all subsequent attempts to access the target table to access the revised table involves assigning to the revised table the second name and assigning to the target table the first name.

14. The computer-readable medium of claim 12, further comprising instructions for providing column mapping information between the target table and the revised table.

15. The computer-readable medium of claim 12, wherein the one or more attributes that are different than corresponding attributes of the target table include at least one of:
  storage parameters that are associated with the revised table;
  re-location to a tablespace that is different than a tablespace that is associated with the target table;
  renaming columns that are copied from the target table;
  adding new columns to the revised table; and
  transforming data one or more columns of the revised table.

16. The computer-readable medium of claim 12, further comprising instructions for performing the step of creating for the revised table any grants, triggers, constraints and indexes that correspond to the target table.

17. The computer-readable medium of claim 16, wherein the grants, triggers, constraints and indexes that are created for the revised table are disabled while the revised table is being created.

18. The computer-readable medium of claim 16, wherein the grants, triggers, constraints and indexes that are created for the revised table are enabled when the creation of the revised table is complete.

19. The computer-readable medium of claim 16, wherein the corresponding grants, triggers, constraints and indexes of the target table are disabled when the creation of the revised table is complete.

20. The computer-readable medium of claim 12 wherein:
the step of creating a revised table that has one or more attributes that are different than corresponding attributes of the target table includes creating a plurality of revised tables;
while the plurality of revised tables are being created preventing user access to the plurality of revised tables while allowing user access to the target table;
when creation of the revised tables is complete, performing the steps of:
  locking the target table;
  synchronizing the plurality of revised tables with the target table; and
  causing all subsequent attempts to access the target table to access one or more of the revised tables.

21. The computer-readable medium of claim 12 wherein:
the step of creating a revised table that has one or more attributes that are different than corresponding attributes of the target table includes creating a plurality of revised tables based on a plurality of target tables;
while the plurality of revised tables are being created, preventing user access to the plurality of revised tables while allowing user access to the plurality of target tables;
when creation of the revised tables is complete, performing the steps of:
  locking the plurality of target tables;
  synchronizing the plurality of revised tables with the plurality of target tables; and
  causing all subsequent attempts to access at least one of the plurality of target tables to access one or more of the revised tables.

22. The computer-readable medium of claim 12 wherein:
the step of creating a revised table that has one or more attributes that are different than corresponding attributes of the target table includes creating a revised table based on a plurality of target tables;
while the revised table is being created, preventing user access to the revised table while allowing user access to the plurality of target tables;
when creation of the revised table is complete, performing the steps of:
  locking the plurality of target tables;
  synchronizing the revised table with the plurality of target tables; and
  causing all subsequent attempts to access at least one of the plurality of target tables to access the revised table.

* * * * *